Oct. 25, 1955     B. M. WOJCIECHOWSKI     2,721,976
CAPACITANCE MEASURING ELECTRODE
Filed Sept. 10, 1952
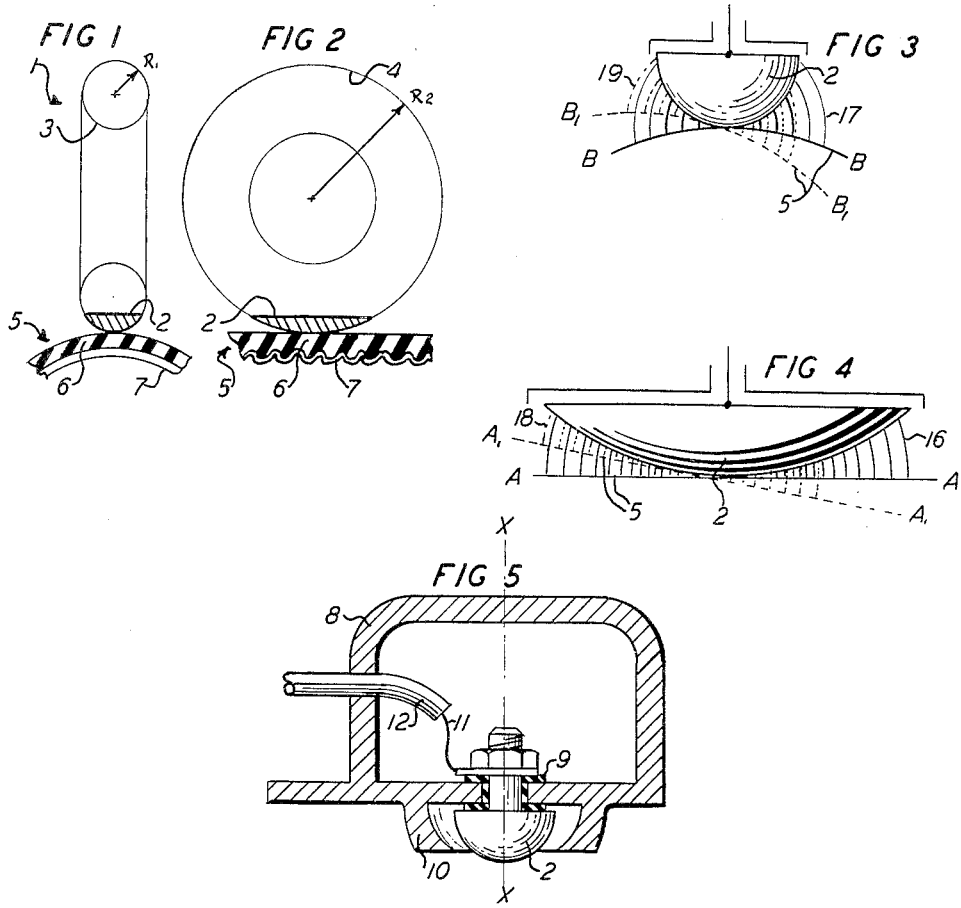
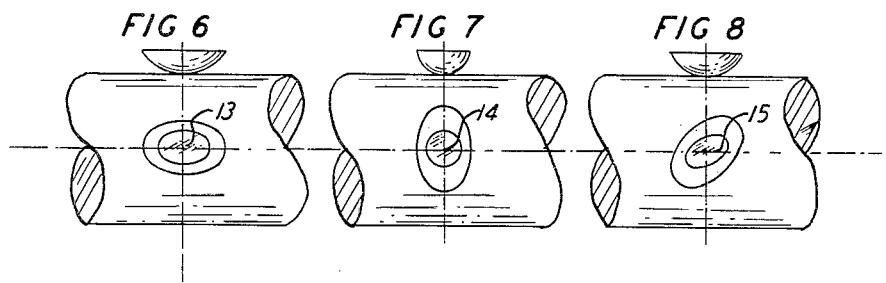
INVENTOR
B. M. WOJCIECHOWSKI
BY
ATTORNEY

United States Patent Office 2,721,976
Patented Oct. 25, 1955

2,721,976

CAPACITANCE MEASURING ELECTRODE

Bogumil M. Wojciechowski, New York, N. Y., assignor to Western Electric Company, Incorporated, New York, N. Y., a corporation of New York Application September 10, 1952, Serial No. 308,878

4 Claims. (Cl. 324—61)

This invention relates to a capacitance measuring electrode and particularly to an electrode for measuring the physical properties of an insulating covering on a metal tube or sheath.

In the manufacture of cable having a metal tube or sheath covered with an insulating material, it is advantageous to make continuous measurements of the eccentricity and thickness of the insulating covering. A system for making such measurements, disclosed in co-pending application, Serial No. 308,877, filed by B. M. Wojciechowski on even date herewith, utilizes two capacitance measuring electrodes located on opposite sides of the cable making slidable contact with the insulating covering. These electrodes or probes are used on cables subjected to some unavoidable swings and vibrations while the cable moves at speeds often exceeding 60 ft. per minute. In this system the capacitance from either of these probes to the metal sheath under equivalent conditions, must match each other within approximately a thousandth of a micromicrofarad, which should not be effected by the unavoidable swings and vibrations as mentioned above.

It is, therefore, the principal object of this invention to provide an electrode for use in making accurate measurements of the physical properties of an insulating covering on a metal tube even when the material tested is being rapidly moved with respect to the electrode.

Applicant accomplishes his object by constructing a probe having a curvilinear, metallic, contacting surface, the curved portions of the longitudinal and transverse cross-sections of which are parts of circles of different radii whereby the probe has essentially the shape of a segment of a toroid.

With this toroid construction the residual capacitance from the probe to the metal cable sheath or tube does not essentially vary as a result of limited displacements and changes of position while the cable is in motion. Also, with this toroid shape, the above mentioned residual capacitance can be conveniently adjusted by the simple expedient of varying its orientation on the insulating covering so that the capacitances of the two probes of the above system to the metal sheath may be equalized.

Other objects and advantages will be apparent from the following detailed description taken in conjunction with the accompanying drawing, in which;

Figs. 1 and 2 show front and side cross-sections respectively of the contact surface of the probe as derived from a toroid;

Figs. 3 and 4 show the relative positionings of the probe for different cable positions;

Fig. 5 is a cross-sectional view of a typical shielded electrode assembly; and

Figs. 6, 7 and 8 show three different positions of the probe for obtaining different residual capacitances.

Referring now to the drawing, Figs. 1 and 2 show the transverse and longitudinal cross-sections respectively of the probe element 2 as developed from a toroid 1 having minor and major circles 3 and 4 respectively of different radii. While the size of these circles are not limited to any particular value, it has been found the minor and major circles having radii of ¼″ and 1″ respectively, are especially well suited for making measurements on most sizes of electric cable. Figs. 1 and 2 also show transverse and longitudinal views of a portion of a cable 5 having insulating covering 6 and conductive sheath 7 and its normal relative position with respect to the probe 2.

In Figs. 3 and 4 it is shown how limited displacements and changes in position of the cable 5 with respect to the probe 2, i. e. longitudinally from AA to A′A′ and transversely from BB to B′B′ respectively, does not essentially affect the configuration of the electric field 16 and 17 for positions AA and BB respectively and 18 and 19 for positions A′A′ and B′B′ respectively. Due to the negligible variation in the electric field for these changes in cable position, the capacitance from the probe to the metal sheath of the cable remains substantially unchanged.

In Fig. 5, a cross-section of a typical shielded electrode or probe assembly is shown. In this assembly, the toroid segment contacting surface of the probe 2 is rotatably mounted on a shielded frame 8 and is insulated therefrom by insulator 9. The shielded frame has a projected portion 10 which surrounds the portion of the probe surface which does not actually make contact with the cable while making the measurements. The probe is connected to an external circuit through conductor 11 having a conductive sheath 12 electrically connected to frame 8, this sheath is connected to ground on the shielding potential. This assembly is mounted by conventional means so that the contacting surface of the probe makes a pressure contact with the cable. An assembly of this type when used in the system of the aforementioned co-pending application must be isolated from ground potential. In other systems where the shielding is at ground potential, the frame 8 can be directly mounted on structure which is at ground potential. The means for mounting this assembly in its proper position on the cable should also have provisions for rotating the assembly about the cable as well as about the center line X—X of the assembly itself. Since such means are well known in the art, they will not be further described herein.

Figs. 6, 7 and 8 show how the probe may be positioned to result in different residual capacitances to the cable core, the relative magnitude of the effective capacitances in each case being represented by the shaded areas 13, 14 and 15, respectively. In Fig. 6, where the major axis of the probe element is parallel to the cable axis, the probe to cable capacitance is maximum; in Fig. 7, where the major axis of the probe element is perpendicular to the cable axis, it is minimum, and in Fig. 8, where the major axis of the probe element occupies a position intermediate that of Figs. 6 and 7, it is an intermediate value. By simply rotating the probe contacting surface with respect to the cable, either by rotating the probe element alone, or the entire assembly on which the probe is mounted, initial residual capacitance adjustments may be very easily made. This feature has particular utility in a system such as described in applicant's aforementioned co-pending patent application wherein two probes make contact with the insulating covering of a cable and it is necessary that their residual capacitances to the metal cable sheath be made substantially equal.

While the invention has been described in terms of making measurements on insulating covering on a metallic cable sheath, it is, of course, not limited to such but can be used in making measurements on any non-conductive coating on curved metallic surfaces or tubes.

Numerous other arrangements may be readily devised by those skilled in the art which will embody the principles of the invention and fall within the spirit and scope thereof.

What is claimed is:

1. An electrode for making measurements on an insulating covering on a metallic cable sheath comprising a metallic, covering-contacting portion having substantially the configuration of a segment of a toroid, the toroidal-curvilinear surface thereof being the sensing surface of the electrode, means for supporting the said curvilinear surface on the covering and means for adjustably orienting said portion to vary the capacitance between the electrode and the metal sheath.

2. An electrode for use in measuring the properties of a non-conducting coating on a metal tube comprising a metallic, coating-contacting portion having substantially the configuration of a segment of a toroid, the toroidal-curvilinear surface thereof being the sensing surface of the electrode, means for supporting the curvilinear surface of said portion on the coating and means for adjustably orienting said portion to vary the capacitance between the electrode and the metal tube.

3. An electrode for making capacitance measurements on an insulating coating on a curved metallic member comprising a curvilinear, metallic, coating-contacting portion, the curvilinear surface thereof being the sensing surface of the electrode, the curved parts of the longitudinal and transverse cross-sections of the said portion being substantially segments of circles of different radii, means for supporting the curvilinear surface on the coating and means for adjustably orienting said portion to vary the capacitance between the electrode and the metallic member.

4. An electrode for making capacitance measurements on an insulating coating on a metallic cable sheath comprising a metallic coating-contacting portion having a curvilinear and a flat surface, the curvilinear surface thereof being the sensing surface of the electrode, the longitudinal and transverse cross-sections of the curvilinear surface being substantially arcs of circles of different radii, means for supporting the curvilinear surface of said portion on the coating connected to the flat surface and means for adjustably orienting said portion to vary the capacitance between the electrode and the metallic sheath.

References Cited in the file of this patent

UNITED STATES PATENTS

| | | |
|---|---|---|
| 2,274,735 | Peters et al. | Mar. 3, 1942 |
| 2,285,152 | Firestone | June 2, 1942 |
| 2,601,649 | Wadman | June 24, 1952 |
| 2,604,512 | Bacon et al. | July 22, 1952 |